United States Patent Office 3,644,304
Patented Feb. 22, 1972

3,644,304
ETHYLENE-PROPYLENE-DIENE ELASTOMER
Rudolf Adolf Behrens, Gladstone, N.J., assignor to American Cyanamid Company, Stamford, Conn.
No Drawing. Filed July 31, 1969, Ser. No. 846,608
Int. Cl. C08f 15/04
U.S. Cl. 260—79.5 B
9 Claims

ABSTRACT OF THE DISCLOSURE

A vulcanizable composition containing a diene modified ethylene-propylene elastomer, copper 2-mercaptobenzothiazole and a thiuram sulfide or a metal dithiocarbamate.

---

This invention relates, generally, to diene modified ethylene-propylene elastomers and, more particularly, to a novel and improved vulcanizable composition containing a diene modified ethylene-propylene elastomer.

Ethylene-propylene elastomers are relatively new products which ar difficult to vulcanize because of the absence of unsaturation. One method of adding unsaturation is to modify the ethylene-propylene polymer with relatively small amounts of a diene to produce a terpolymer having unsaturated side chains. Such products are commonly known as EPDM rubber or EPT (ethylene-propylene-diene terpolymer).

Even with the unsaturation provided by the termonomer, diene modified ethylene-propylene elastomers are difficult to vulcanize. Accelerators such as the thiazoles and thiuram sulfides used in curing other types of elastomers do not provide a suitable cure rate when used alone in diene modified ethylene-propylene elastomers. Consequently, combinations of such accelerators have been used. One such system for sulfur based vulcanization of diene modified ethylene-propylene elastomers disclosed in U.S. Pat. 3,198,778 contains a combination of a thiazole, usually mercaptobenzothiazole and a thiuram disulfide. The cure rate, however, is too slow for many purposes. In order to improve the cure rate, very strong accelerator systems containing expensive compounds such as, for example, a mixture of tetramethylthiuram disulfide, dipentamethylenethiuram tetrasulfide and tellurium diethyldithiocarbamate have been used. However, these stronger accelerators frequently reduce the scorch time and induce bloom on the surface of the rubber.

It is, therefore, an object of this invention to provide a sulfur vulcanizable diene modified ethylene-propylene composition having improved scorch protection and adapted to be cured at an advantageous rate without undesirable bloom on the surface of the vulcanizate. Another object of the invention is to provide a sulfur vulcanizable diene modified ethylene-propylene elastomer based composition which has an improved cure rate and lower compression set but which does not require the use of expensive, strongly active accelerators which are prone to be scorchy and/or produce undesirable bloom on the surface of the vulcanizate. A further object of the invention is to provide an improved method for vulcanizing a diene modified ethylene-propylene elastomer. Still another object of the invention is to provide a diene modified ethylene-propylene elastomer vulcanizate which is substantially free from bloom and has an improved state of cure.

The foregoing objects and others are accomplished in accordance with this invention, generally speaking, by providing a composition containing a diene modified ethylene-propylene elastomer, copper 2-mercaptobenzothiazole and a thiuram sulfide or metal dithiocarbamate. It has been found that such a composition can be vulcanized by heating to conventional vulcanizing temperatures to produce a vulcanizate in an acceptable period of time without scorching and without the production of undesirable bloom on the surface of the vulcanizate. The vulcanizable composition provided by this invention is particularly advantageous when the elastomer is an ethylene-propylene-norbornene terpolymer. A composition containing an ethylene-propylene-norbornene elastomer mixed with copper 2-mercaptobenzothiazole and a thiuram sulfide or metal dithiocarbamate has a very greatly improved cure rate, improved scorch time and produces upon vulcanization a vulcanizate having an improved state of cure. Scorch protection is improved by combining copper 2-mercaptobenzothiazole with a thiuram sulfide or metal dithiocarbamate as an accelerator system in compositions containing a diene modified ethylene-propylene elastomer when the diolefin is similar in structure to 1,4-hexadiene, dicyclopentadiene or the like. The vulcanizable composition provided by this invention does not require the use of expensive accelerators and is made from readily available, easily produced, inexpensive components.

This invention, in its broadest aspects, contemplates a vulcanizable composition containing a diene modified ethylene-propylene elastomer mixed in any suitable proportions with an accelerating amount of copper 2-mercaptobenzothiazole and a thiuram sulfide or metal dithiocarbamate. However, in most compositions from about 0.1 to about 3 parts copper 2-mercaptobenzothiazole and from about 0.3 to about 5 parts thiuram sulfide or metal dithiocarbamate are used per 100 parts by weight or diene modified ethylene-propylene elastomer. Best results are obtained with from about 0.25 to about 1.5 parts copper 2-mercaptobenzothiazole and from about 0.6 to about 2.5 parts thiuram sulfide or metal dithiocarbamate per 100 parts by weight diene modified ethylene-propylene elastomer so these ranges are preferred. In some embodiments, a mixture of one or more thiuram sulfides with one or more metal dithiocarbamates may be used in combination with copper 2-mercaptobenzothiazole.

The cure rate of compositions containing a diene modified ethylene-propylene elastomer and copper 2-mercaptobenzothiazole as the only accelerator is too slow. Likewise, thiuram sulfides or metal dithiocarbamates alone are disadvantageous for vulcanizing ethylene-propylene-diene elastomers because of the tendency to cause bloom when used in an amount sufficient to produce an acceptable cure rate.

It has been found that copper 2-mercaptobenzothiazole is unique among metal salts of mercaptobenzothiazole. Substitution of zinc, manganese, iron or other similar metal salts of 2-mercaptobenzothiazole for copper 2-mercaptobenzothiazole in the compositions provided by this invention does not produce the same result.

For best results, free sulfur is included in the vulcanizable composition but, in some compositions, it can be omitted with the sulfur required for cross-linking being supplied by the accelerator. However, most vulcanizable compositions contain from about 0.3 to about 5 parts sulfur per 100 parts by weight of the diene modified ethylenepropylene elastomer. Preferably, from about 0.25 to about 2 parts free sulfur per 100 parts by weight diene modified ethylene-propylene elastomer are used.

The combination of copper 2-mercaptobenzothiazole and a thiuram disulfide or a metal dithiocarbamate can be used to advantage in sulfur vulcanizable compositions containing any diene modified ethylene-propylene elastomer. Examples of diene modified ethylene-propylene elastomers which can be used in the vulcanizable compositions of this invention are disclosed in a technical report published by E. I. du Pont de Nemours and Company entitled "NORDEL Hydrocarbon Rubber" (April, 1964).

Amberg discloses other suitable ethylene-propylene-diene terpolymers in "Vulcanization of Elastomers" (Alliger and Sjothun ed. 1963). The ethylene-propylene-diene terpolymers described in "Ethylene Propylene Rubbers," J. Institute of Rubber Industry, October 1968, pp. 228–232, are also contemplated by this invention. Usually, the terpolymer contains up to about 10 mole percent diene. Preferred dienes are 1,4-hexadiene, dicyclopentadiene, 5-methylene-2-norbornene, methyl tetrahydroindene and 5-ethylidene-2-norbornene but others including 11-ethyl-1, 11-tridecadiene, cyclooctadiene and the like can be used.

Any suitable thiuramsulfide can be used in combination with copper 2-mercaptobenzothiazole in accordance with this invention such as, for example, tetramethylthiuram monosulfide, tetramethylthiuram disulfide, tetraethylthiuram monosulfide, tetraethylthiuram disulfide, dipentamethylenethiuram tetrasulfide, dipentamethylenethiuram hexasulfide, cyclohexamethylenethiuram disulfide, phenylethylthiuram disulfide, bis(morpholinothiocarbonyl)disulfide, and the like, and mixtures thereof. One preferred mixture combines tetramethylthiuram monosulfide and bis(morpholinothiocarbonyl)sulfide with copper 2-mercaptobenzothiazole.

Any suitable metal dithiocarbamate can be used such as, for example, zinc dibutyl dithiocarbamate, zinc pentamethylene dithiocarbamate, bismuth dimethyldithiocarbamate, nickel dibutyldithiocarbamate, copper dimethyldithiocarbamate, selenium diethyldithiocarbamate, lead dimethyldithiocarbamate, selenium dimethyldithiocarbamate, tellurium dimethyldithiocarbamate, tellurium diethyldithiocarbamate, cadmium diethyldithiocarbamate, zinc dibenzyldithiocarbamate, zinc diethyldithiocarbamate, and the like, and mixtures thereof.

The vulcanizable composition is prepared by conventional methods using equipment commonly available to rubber compounders. The various components may be mixed together in a Banbury mixer, a two-roll mill or the like. In addition to the copper 2-mercaptobenzothiazole, thiuram sulfide or metal dithiocarbamate and, preferably, free sulfur, the vulcanizable composition contains the usual rubber compounding ingredients in conventional amounts such as carbon black, titanium dioxide, clay, silica, alumina, calcium carbonate, talc, pigments, anti-static agents, extending oils, lubricating oils, processing aids such as stearic acid, antioxidants, and the like. The vulcanizable composition may be shaped and cured in conventional compression molding, transfer molding, injection molding or similar equipment. It may also be cured in steam curing equipment or in a salt bath. The vulcanizable composition can be used for making various articles commonly made from rubber such as those disclosed in the J. Institute of Rubber Industry article, supra.

In the following examples all parts are by weight unless otherwise specified.

EXAMPLE I (a) About 100 parts of an ethylene-propylene-dicyclopentadiene elastomer known commercially as Royalene 302, about 100 parts Fast Extruding Furnace (FEF) carbon black, about 100 parts Semi Reinforcing Furnace (SRF) carbon black, about 120 parts naphthenic oil, about 5 parts zinc oxide and about 1 part stearic acid are mixed at a temperature of from about 280° F. to about 300° F. for about five minutes in a Banbury mixer. The resulting premix is then mixed with about 1.5 parts sulfur, about 0.75 part tetramethylthiuram disulfide and about 1.5 parts copper 2-mercaptobenzothiazole at a temperature of about 50° C. on a two-roll mill for about fifteen minutes.

(b) The same as (a) except about 1.5 parts 2-mercaptobenzothiazole is substituted for the copper 2-mercaptobenzothiazole.

EXAMPLE II

Example I, paragraphs (a) and (b), is repeated except an ethylene-propylene-1,4-hexadiene elastomer known commercially as NORDEL 1470 is used.

EXAMPLE III

Example I, paragraphs (a) and (b), is repeated except an ethylene-propylene-5-ethylidene-2-norbornene elastomer known commercially as Royalene 502 is used.

EXAMPLE IV

Example I, paragraphs (a) and (b), is repeated except an ethylene-propylene-methylene norbornene elastomer known commercially as Vistalon 4608 is used.

The compositions of the foregoing examples were evaluated for scorch time using a Mooney Viscometer, and for cure characteristics using a Monsanto Oscillating Disc Rheometer by techniques commonly used in the art, with the following results:

TABLE 1

| | Example number | | | | | | | |
|---|---|---|---|---|---|---|---|---|
| | I | | II | | III | | IV | |
| | a | b | a | b | a | b | a | b |
| Mooney Scorch $T_5$ at 270° F | 30.0 | 19.5 | 19.1 | 10.9 | 11.3 | 9.3 | 14.0 | 10.8 |
| Monsanto Oscillating Disc Rheometer at 400° F.: | | | | | | | | |
| Max. cure rate [1] | 0.45 | 0.40 | 1.4 | 1.4 | 3.2 | 2.2 | 1.9 | 1.1 |
| Time to 90% full cure (min.) | 4.12 | 3.95 | 3.15 | 2.67 | 2.24 | 2.88 | 2.75 | 3.07 |
| Max. torque (in lb.) | 20.1 | 19.8 | 32.3 | 33.2 | 47.0 | 39.6 | 32.8 | 26.3 |

[1] Slope of torque-time curve at steepest, units are in. lbs./0.083 minutes with instrument settings used.

It is apparent from the foregoing data that greater scorch protection is provided by copper 2-mercaptobenzothiazole than 2-mercaptobenzothiazole. Compositions containing norbornene modified ethylene-propylene elastomers and copper 2-mercaptobenzothiazole have a faster cure rate and a higher state of cure than similar compositions containing 2-mercaptobenzothiazole.

EXAMPLE V (a) A premix is prepared by mixing in a Banbury mixer at from about 280° F. to about 300° F. for about four to five minutes about 100 parts 5-ethylidene-2-norbornene modified ethylene-propylene elastomer, about 50 parts naphthenic oil, about 60 parts SAF carbon black, about 20 parts Intermediate Super Abrasion Furnace-High Structure (ISAF-H) carbon black, about 5 parts zinc oxide and about 1 part stearic acid. The premix is mixed with about 1.5 parts sulfur, about 0.75 part copper 2-mercaptobenzothiazole and about 0.8 part tetramethylthiuram disulfide on a two-roll rubber mill for about fifteen minutes to prepare a vulcanizable composition.

(b) A composition like (a) is prepared except 0.75 part 2-mercaptobenzothiazole is substituted for the copper 2-mercaptobenzothiazole.

EXAMPLE VI

Example V, paragraphs (a) and (b), is repeated except 1.5 parts of copper 2-mercaptobenzothiazole are used in (a) and 1.5 parts of 2-mercaptobenzothiazole are used in (b).

EXAMPLE VII

Example V, paragraphs (a) and (b), is repeated except about 3 parts of copper 2-mercaptobenzothiazole and mercaptobenzothiazole are used.

EXAMPLE VIII

Example V(b) is repeated except about 3 parts 2-mercaptobenzothiazole are used without any tetramethylthiuram disulfide.

EXAMPLE IX

Example V(a) is repeated except about 3 parts copper 2-mercaptobenzothiazole are used without any tetramethylthiuram disulfide.

EXAMPLE X

Example V(a) is repeated except the copper 2-mercaptobenzothiazole is deleted.

The following physical data were obtained on the compositions thus prepared:

TABLE 2

| | V | | VI | | VII | | VIII | IX | X |
|---|---|---|---|---|---|---|---|---|---|
| | a | b | a | b | a | b | | | |
| Mooney Scorch at 270° F.: t₅m minutes | 7.6 | 6.5 | 13.2 | 5.9 | 17.1 | 5.6 | 18.2 | 24.7 | 9.2 |
| Oscillating Disc Rheometer at 320° F.: | | | | | | | | | |
| Cure rate | 6.3 | 4.4 | 7.1 | 5.2 | 6.6 | 4.7 | 0.75 | 1.0 | 3.0 |
| Time to 90% max. torque, min | 18.8 | 25.7 | 19.3 | 23.3 | 19.5 | 21.3 | 66 | 56.5 | 32.8 |
| Max. torque, in lbs | 65.5 | 62 | 79.5 | 63.5 | 74.5 | 67.5 | 47 | 45 | 62.5 |

The data obtained with the compositions of Examples V through VII illustrate the improved sorch protection and cure rate provided by combining copper 2-mercaptobenzothiazole instead of 2-mercaptobenzothiazole with a thiuram sulfide. The results obtained with the compositions of Examples VIII, IX and X indicate that copper 2-mercaptobenzothiazole, mercaptobenzothiazole, or tetramethylthiuram disulfide alone provide a slow cure rate. Comparison of the results of Examples VIII, IX and X with those obtained with the compositions of Examples V(a), VI(a) and VII(a) illustrates the synergistic effect obtained with the novel combination of accelerators provided by this invention. The maximum torque figures indicate an improved state of cure when copper 2-mercaptobenzothiazole is used.

The scorch data in Tables 1, 2 and 3 were determined as the time in minutes at which the viscosity of the unvulcanized elastomer reached a value of 5 Mooney units above the minimum, as measured on a Mooney Viscometer at 270° F. using a large rotor. The cure rate determinations were made with a Monsanto Oscillating Disc Rheometer at 320° F. or 400° F., as indicated, following the technique described in "Rubber World," 147 pp. 68–71, (1962).

Although the invention has been described in detail for the purpose of illustration, it is to be understood that such detail is only for that purpose and that those skilled in the art can make alterations therein without departing from the spirit and scope of this invention.

What is claimed is:
1. A vulcanizable composition comprising an unvulcanized diene modified ethylene-propylene elastomer and an accelerating amount of copper 2 - mercaptobenzothiazole and a thiuram sulfide or a metal dithiocarbamate.
2. The composition of claim 1 containing free sulfur and from about 0.1 to about 3 parts copper 2-mercaptobenzothiazole and from about 0.3 to about 5 parts thiuram sulfide or metal dithiocarbamate per 100 parts elastomer.
3. The composition of claim 1 containing a mixture of bis(morpholinothiacarbonyl)disulfide and a tetramethylthiuram monosulfide.
4. A method for vulcanizing a diene modified ethylene-propylene elastomer which comprises heating to vulcanizing temperature the composition of claim 1 until a vulcanizate is obtained.
5. The composition of claim 1 containing from about 0.3 to about 5 parts sulfur, from about 0.1 to about 3 parts copper 2-mercaptobenzothiazole and from about 0.3 to about 5 parts thiuram sulfide or metal dithiocarbamate per 100 parts by weight of elastomer.
6. The composition of claim 1 containing a mixture of thiuram sulfide and metal dithiocarbamate.
7. The composition of claim 1 containing a mixture of bis(morpholinothiocarbonyl)monosulfide and tetramethylthiuram monosulfide.
8. The composition of claim 1 wherein the diene is a norbornene.
9. The vulcanizate obtained by vulcanizing the composition of claim 1.

References Cited
UNITED STATES PATENTS 3,494,900  2/1970  Morita et al. _____ 260—79.5

JOSEPH L. SCHOFER, Primary Examiner

R. A. GAITHER, Assistant Examiner

U.S. Cl. X.R.

260—88.25, 80.78